US008157207B2

(12) United States Patent
Mengle et al.

(10) Patent No.: US 8,157,207 B2
(45) Date of Patent: Apr. 17, 2012

(54) JET ENGINE NOZZLE EXIT CONFIGURATIONS, INCLUDING PROJECTIONS ORIENTED RELATIVE TO PYLONS, AND ASSOCIATED SYSTEMS AND METHODS

(75) Inventors: Vinod G. Mengle, Bellevue, WA (US); Russell H. Thomas, Yorktown, VA (US)

(73) Assignees: The Boeing Company, Chicago, IL (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 615 days.

(21) Appl. No.: 11/836,517

(22) Filed: Aug. 9, 2007

(65) Prior Publication Data
US 2008/0272228 A1 Nov. 6, 2008

Related U.S. Application Data

(60) Provisional application No. 60/836,861, filed on Aug. 9, 2006.

(51) Int. Cl.
*B64D 31/00* (2006.01)
*F02K 1/46* (2006.01)
*F02K 3/02* (2006.01)
(52) U.S. Cl. .................. 244/53 R; 60/226.1; 60/262
(58) Field of Classification Search .............. 244/54, 244/53 R; 60/226.1, 204, 262, 39.5, 770, 60/226.2; 239/265.17, 265.19
See application file for complete search history.

(56) References Cited

U.S. PATENT DOCUMENTS

| | | | |
|---|---|---|---|
| 3,568,792 A | 3/1971 | Urquhart | |
| 3,648,800 A | 3/1972 | Hoerst | |
| 3,721,314 A | 3/1973 | Hoch et al. | |
| 4,215,536 A | 8/1980 | Rudolph | |
| 4,372,110 A | 2/1983 | Fletcher et al. | |
| 4,487,017 A * | 12/1984 | Rodgers | 60/262 |
| 4,819,425 A | 4/1989 | Farquhar et al. | |
| 5,117,628 A | 6/1992 | Koshoffer | |
| 5,884,472 A | 3/1999 | Presz, Jr. et al. | |
| 5,947,412 A | 9/1999 | Berman | |
| 6,082,635 A | 7/2000 | Seiner et al. | |

(Continued)

FOREIGN PATENT DOCUMENTS

EP 0557552 1/1993

(Continued)

OTHER PUBLICATIONS

Aeroacoustics, Aerospace Sciences, Aerospace America, Dec. 2005, 1 pg.

(Continued)

*Primary Examiner* — Tien Dinh
(74) *Attorney, Agent, or Firm* — Perkins Coie LLP

(57) ABSTRACT

Nozzle exit configurations and associated systems and methods are disclosed. An aircraft system in accordance with one embodiment includes a jet engine exhaust nozzle having an internal flow surface and an exit aperture, with the exit aperture having a perimeter that includes multiple projections extending in an aft direction. Aft portions of individual neighboring projections are spaced apart from each other by a gap, and a geometric feature of the multiple can change in a monotonic manner along at least a portion of the perimeter. Projections near a support pylon and/or associated heat shield can have particular configurations, including greater flow immersion than other projections.

22 Claims, 10 Drawing Sheets

U.S. PATENT DOCUMENTS

| | | | |
|---|---|---|---|
| 6,314,721 B1 | 11/2001 | Mathews et al. | |
| 6,352,009 B1 | 3/2002 | Gaidjiergis | |
| 6,360,528 B1 | 3/2002 | Brausch et al. | |
| 6,360,538 B1 | 3/2002 | McGowan et al. | |
| 6,532,729 B2 | 3/2003 | Martens | |
| 6,612,106 B2 | 9/2003 | Balzer | |
| 6,640,537 B2 * | 11/2003 | Tse | 60/262 |
| 6,658,839 B2 | 12/2003 | Hebert | |
| 6,718,752 B2 | 4/2004 | Nesbitt et al. | |
| 6,751,944 B2 | 6/2004 | Lair | |
| 6,786,037 B2 | 9/2004 | Balzer | |
| 6,813,877 B2 | 11/2004 | Birch | |
| 6,837,456 B1 | 1/2005 | Shih et al. | |
| 6,969,028 B2 | 11/2005 | Dun | |
| 6,971,229 B2 | 12/2005 | Lair | |
| 7,010,905 B2 | 3/2006 | Lair | |
| 7,055,329 B2 | 6/2006 | Martens et al. | |
| 7,093,423 B2 | 8/2006 | Gowda et al. | |
| 7,114,323 B2 | 10/2006 | Schlinker et al. | |
| 7,246,481 B2 | 7/2007 | Gutmark et al. | |
| 7,310,939 B2 * | 12/2007 | Prouteau et al. | 60/262 |
| 7,469,529 B2 * | 12/2008 | Feuillard et al. | 60/226.1 |
| 7,520,124 B2 | 4/2009 | Narayanan et al. | |
| 7,966,824 B2 | 6/2011 | Mengle | |
| 2002/0125340 A1 | 9/2002 | Birch et al. | |
| 2002/0178711 A1 | 12/2002 | Martens | |
| 2003/0182925 A1 | 10/2003 | Lair | |
| 2003/0201366 A1 | 10/2003 | Connelly et al. | |
| 2004/0074224 A1 | 4/2004 | Hebert | |
| 2004/0088967 A1 | 5/2004 | Webster et al. | |
| 2004/0237501 A1 | 12/2004 | Brice et al. | |
| 2008/0078159 A1 | 4/2008 | Thomas et al. | |
| 2008/0134665 A1 | 6/2008 | Birch et al. | |
| 2009/0302487 A1 | 12/2009 | Young | |
| 2011/0072781 A1 | 3/2011 | Birch et al. | |
| 2011/0155862 A1 | 6/2011 | Mengle | |

FOREIGN PATENT DOCUMENTS

| | | |
|---|---|---|
| EP | 0913567 A2 | 5/1999 |
| EP | 0984152 A2 | 3/2000 |
| EP | 1367249 A1 | 12/2003 |
| EP | 1482160 A1 | 12/2004 |
| EP | 1580418 A2 | 9/2005 |
| EP | 1703114 A1 | 9/2006 |
| EP | 1905998 A2 | 4/2008 |
| FR | 2091911 A1 | 1/1971 |
| GB | 1127659 A | 9/1968 |
| GB | 2146702 A | 4/1985 |
| GB | 2149456 A | 6/1985 |
| GB | 2207468 A | 2/1989 |
| WO | WO-0053915 A1 | 9/2000 |
| WO | WO-02/29232 | 4/2002 |
| WO | WO-2005/021934 A2 | 3/2005 |

OTHER PUBLICATIONS

Alkislar, Mehmet et al., "Significant Improvements in Jet Noise Reduction using Chevron—Microjet Combination," American Institute of Aeronautice and Astronautics, (2007), 5 pgs.

Alkislar, Mehmet et al., "The Effect of Streamwise Vortices on the Aeroacoustics of a Mach 0.9 Jet.," Nov. 7, 2006, Department of Mechanical Engineering, Tallahassee, FL, 47 pgs.

Arakeri, V.H. et al., "On the use of microjets to suppress turbulence in a Mach 0.9 axisymmetric jet," J. Fluid Mech. (2003), vol. 490, pp. 75-98, Cambridge University Press.

Bridges, James et al., "Parametric testing of chevrons on single flow hot jets," AIAA 2004-2824, 10th AIAA/CEAS Aeroacoustics Conference, May 10, 2004, 17 pgs.

Dash, S.M. et al., "CFD Support for Jet Noise Reduction Concept Design and Evaluation for F/A 18 E/F Aircraft," Combustion Research and Flow Technology, Inc. (2005), 6 pgs.

Greska, et al., "The Effects of Microjet Injection on an F404 Jet Engine," AIAA 2005-3047, 11th AIAA/CEAS Aeroacoustics Conference, May 23-25, 2005, Monterey, California, 23 pgs.

Janardan, B.A. et al., AST Critical Propulsion and Noise Reduction Technologies for Future Commercial Subsonic Engines, NASA CR 2000-210039, Dec. 2000, 300 pgs.

Krothapalli, A., "Aeroacoustics of Twin Supersonic Impinging Jets," AIAA Conference, May 12, 2003, 11 pgs.

Massey, S. J. et al, "Computational Analyses of Propulsion Aeroacoustics for Mixed Flow Nozzle Pylon Installation at Takeoff," NASA/CR-2001-211056, Sep. 2001.

Massey, Steven J., "Computational Analysis of a Chevron Nozzle Uniquely Tailored for Propulsion Airframe Aeroacoustics," AIAA 2006-2436, 12th AIAA/CEAS Conference, May 8-10, 2006, Cambridge, MA, 23 pgs.

Mengle, Vinod G. et al., "Flight Test Results for Uniquely Tailored Propulsion-Airframe Aeroacoustic Chevrons; Shockcell Noice," AIAA 2006-2439, 12th AIAA/CEAS Conference, May 8-10, 2006, Cambridge, MA; 17 pgs.

Mengle, Vinod G. et al., "Reducing Propulsion Airframe Aeroacoustic Interactions with Uniquely Tailored Chevrons: 2 Installed Nozzles," 12th AIAA/CEAS Conference, AIAA 2006-2434, May 8-10, 2006, Cambridge, MA, 14 pgs.

Mengle, Vinod G. et al., "Reducing Propulsion Airframe Aeroacoustic Interactions with Uniquely Tailored Chevrons: 3. Jet-Flap Interaction," AIAA 2006-2435, 12th AIAA/CEAS Conference, May 8-10, 2006, Cambridge, MA, 15 pgs.

Mengle, Vinod G., "Internal Flow and Noise of Chevrons and Lobe Mixers in Mixed-Flow Nozzles," AIAA 2006-0623, 44th AIAA Meeting; Jan. 9-12, 2006, Reno, NV, 17 pgs.

Mengle, Vinod G., "Jet Noise Characteristics of Chevrons in Internally Mixed Nozzels," AIAA 2005-2934, 11th AIAA/CEAS Conference, May 23-25, 2005, Monterey, CA; 15 pgs.

Mengle, Vinod G., "Reducing Propulsion Airframe Aeroacoustic Interactions with Uniquely Tailored Chevrons: 1. Isolated Nozzles," AIAA 2006-2467; 12th AIAA/CEAS Conference, May 8-10, 2006, Cambridge, MA, 18 pgs.

Mengle, Vinod G., "Relative Clocking of Enhanced of Mixing Devices of Jet Noice Benefit," AIAA-2005-0996; AIAA Meeting, Jan. 10-13, 2005, Reno, NV; 14 pgs.

Nesbitt, Eric et al., "Flight Test Results for Uniquely Tailored Propulsion-Airframe Aeroacoustic Chevrons; Community Noise," AIAA 2006-2438, 12th AIAA/CEAS Conference, May 8-10, 2006; Cambridge, MA, 13 pgs.

Results of NASA Aircraft Noise Research; http://www.aero-space.nasa.gov/vsp/QTD2.htm; accesses Jul. 12, 2006, 2 pgs.

Saiyes, Naseem H. et al., "Acoustics and Thrust of Quiet Separate-Flow High-Bypass-Ratio Nozzles," AIAA Journal, vol. 41, No. 3, Mar. 2003, pp. 372-378.

Thomas, Russel H. et al., "Computational Analysis of Pylon-Chevron Core Nozzle Interaction," pp. 1-12, AIAA/CEAS Aeroacoustics Conference, AIAA 2001-2185, May 28-30, 2001, Maastricht, The Netherlands.

Thomas Russell H. et al., "Jet-Pylon Interaction of High Bypass Ratio Separate Flow Nozzle Configurations", AIAA/CEAS Aeroacoustics Conference, AIAA 2004-2827, May 12-14, 2004, Hampton, VA.

Wallace, James, "Boeing makes 'quiet' advances," Seattle Post-Intellengencer, Aug. 11, 2005, 4 pgs.

International Search Report and Written Opinion, International Patent Application No. PCT/US2008/072795, Applicant: The Boeing Company, mailed Aug. 11, 2008, 20 pages.

U.S. Appl. No. 11/502,130, filed Aug. 9, 2006, Mengle et al.

Bultemeier et al., "Effect of Uniform Chevrons on Cruise Shockcell Noise," AIAA-2006-2440 27th Aeroacoustics Conference, Cambridge, Massachusetts, May 8-10, 2006, 15 pages.

Non-Final Office Action for U.S. Appl. No. 11/502,130, mailed on Mar. 19, 2010, 16 pages.

Woodward et al., "Aeroacoustic Analysis of Fan Noise Reduction with Increased Bypass Nozzle Area," AIAA-2005-3075 26th Aeroacoustics Conference, Monteray, California, May 23-25, 2005, 33 pages.

* cited by examiner

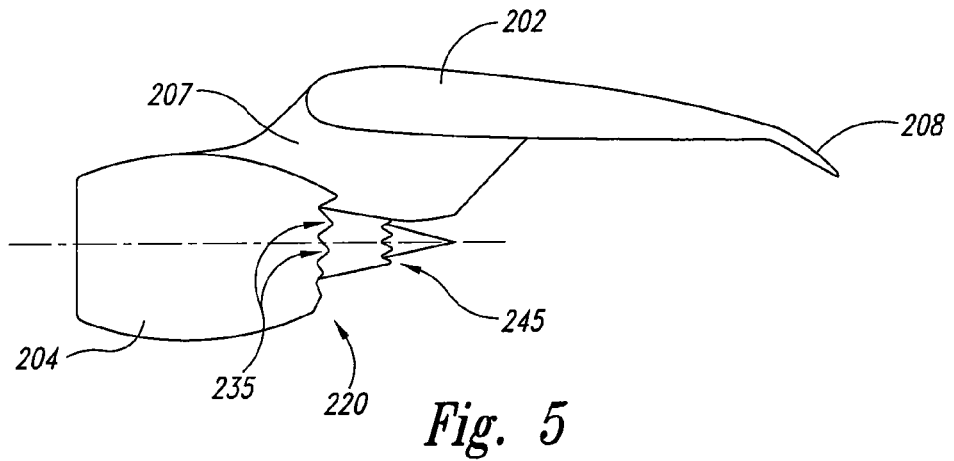
*Fig. 5*
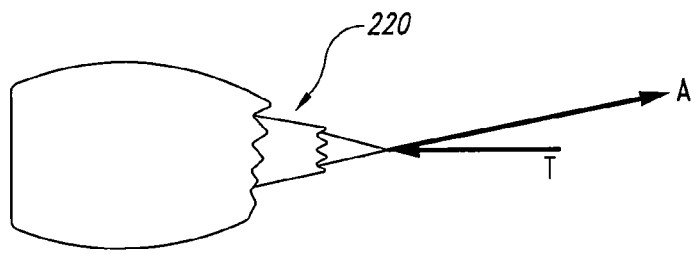
*Fig. 6A*
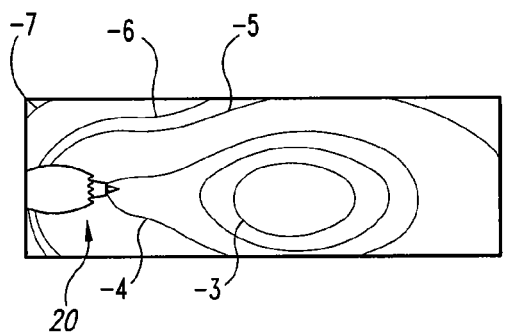     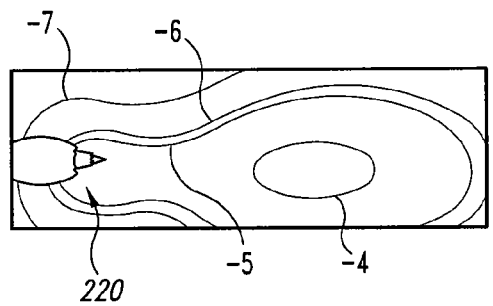
*Fig. 6B*         *Fig. 6C*

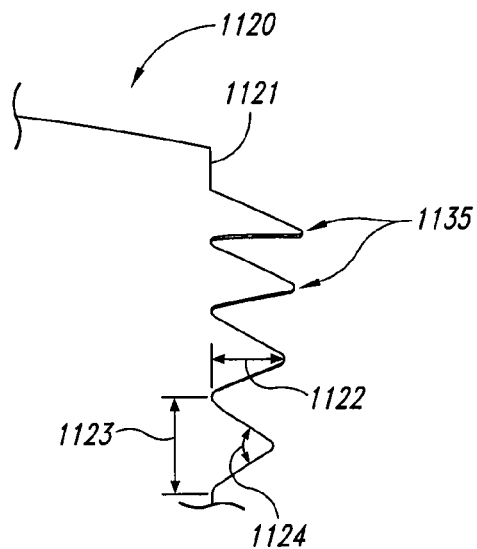
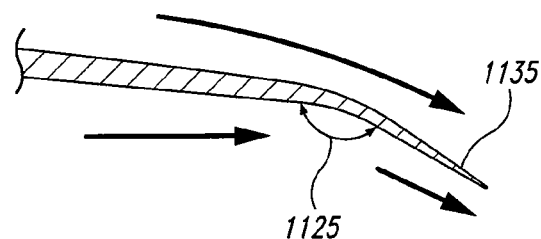
*Fig. 11A*  *Fig. 11B*
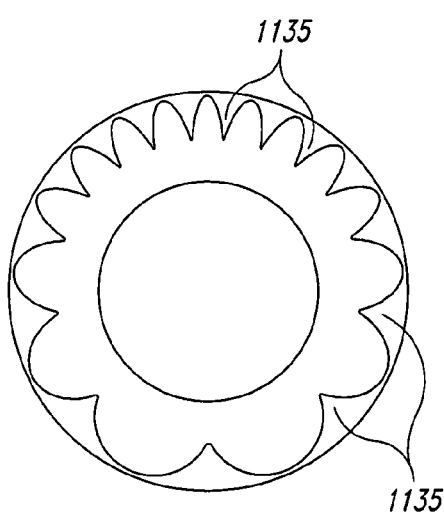
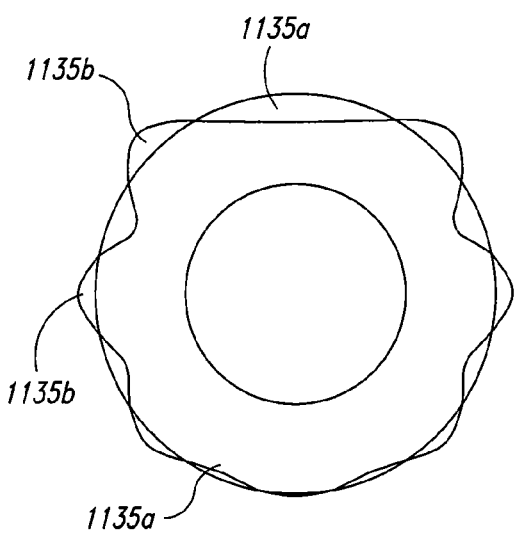
*Fig. 11C*  *Fig. 11D*

JET ENGINE NOZZLE EXIT CONFIGURATIONS, INCLUDING PROJECTIONS ORIENTED RELATIVE TO PYLONS, AND ASSOCIATED SYSTEMS AND METHODS

CROSS-REFERENCE TO RELATED APPLICATION

The present application claims priority to U.S. Provisional Application No. 60/836,861, filed on Aug. 9, 2006 and incorporated herein by reference.

STATEMENT REGARDING FEDERALLY SPONSORED RESEARCH

This invention was made with government support under contract number NAS 1-00086 awarded by NASA. The government has certain rights in this invention.

TECHNICAL FIELD

The present disclosure is directed to jet engine nozzle exit configurations and associated systems and methods, including nozzles having chevrons or other projections that vary in a circumferential or azimuthal manner around an exit perimeter of the nozzle.

BACKGROUND

Aircraft manufacturers are under continual pressure to reduce the noise produced by aircraft in order to satisfy increasingly stringent noise certification rules. Aircraft engines are a major contributor to overall aircraft noise. Accordingly, aircraft engines in particular have been the target of manufacturers' noise reduction efforts. Aircraft engines have been made significantly quieter as a result of advanced high bypass ratio engines. These engines derive a significant fraction of their total thrust not directly from jet exhaust, but from bypass air which is propelled around the core of the engine by an engine-driven forwardly mounted fan. While this approach has significantly reduced aircraft noise when compared with pure turbojet engines and low bypass ratio engines, engine and aircraft federal regulations nevertheless continue to require further engine noise reductions.

One approach to reducing engine noise is to increase the amount of mixing between the high velocity gases exiting the engine, and the surrounding freestream air. FIG. 1 illustrates a nozzle 20 having "chevrons" that are designed to produce this effect. Chevrons generally include certain types of serrations on the nozzle lip, typically, triangular in shape having some curvature in the lengthwise cross-section, which slightly immerses them in the adjacent flow. The chevron can project either inwardly or outwardly, by an amount that is on the order of the upstream boundary layer thickness on the inner or outer surface, respectively. In general, the chevron planform shape can also be trapezoidal or rectangular. The nozzle 20 includes a core flow duct 40 through which the engine core flow is directed, and a fan flow duct 30 arranged annularly around the core flow duct 40, through which the fan air passes. The exit aperture of the fan flow duct 30 can include fan flow chevrons 35, and the exit aperture of the core flow duct 40 can include core flow chevrons 45. The chevrons typically reduce the low-frequency noise by increasing the rate at which the engine flow streams mix with the surrounding freestream air at the length scale of the nozzle diameter. While this approach has resulted in noise reduction compared with nozzles that do not include chevrons, further noise reduction is desired to meet community noise standards.

SUMMARY

The following summary is provided for the benefit of the reader only, and is not intended to limit in any way the invention as set forth by the claims. Particular aspects of the disclosure are directed to an aircraft system that includes a pylon having a first side and a second side facing opposite the first side, and a jet engine exhaust nozzle carried by the pylon and having an internal flow surface adjacent to a hot exhaust flow path. The internal flow surface can have an exit aperture with a perimeter that includes multiple projections extending in an aft direction and circumferentially spaced about the perimeter, and with a geometric feature of the multiple projections changing in a monotonic manner along at least a portion of the perimeter. A first projection nearest the first side of the pylon and second projection nearest the second side of the pylon can both be oriented inwardly into the flow path by a greater amount than the remaining projections.

In further particular arrangements, each of the first and second projections has a generally triangular shape with a root and a tip. The root of the first projection can have a first orientation relative to the first side of the pylon and the root of the second projection can have a second orientation relative to the second side of the pylon that generally mirrors the first orientation. The roots or the tips can be offset from the respective sides of the pylons in opposite directions.

Another aspect is directed to a method for operating an aircraft engine and includes directing a flow of hot exhaust gas from an aircraft engine through an exhaust nozzle exit aperture, with the exit aperture having a perimeter with axially extending projections arranged around the perimeter, and with a geometric feature of the projections changing in a monotonic manner along at least a portion of the perimeter. The method can further include controlling the flow of hot exhaust gas near a pylon supporting the engine by directing the flow adjacent to first and second projections located at least partially outwardly from, and nearest to, the oppositely facing sides of the pylon. The first and second projections can be oriented inwardly into the flow by a greater amount than are the remaining projections.

Still another aspect is directed to a method for designing an aircraft system, and includes sizing an engine pylon for carrying an aircraft engine and exhaust nozzle having an exhaust flow path. The method can further include configuring a set of multiple projections extending aft around the exit aperture of the nozzle to have a geometric feature that changes in a monotonic manner along at least a portion of a perimeter of the exit aperture. The projections can include a first projection positioned nearest a first side of the pylon and a second projection positioned nearest a second side of the pylon facing generally opposite the first side. The method can further include configuring a heat shield positioned to protect the pylon from exhaust gases, wherein configuring at least one of the heat shield and the set of projections is based at least in part on expected results of configuring the other of the heat shields in the set of projections.

BRIEF DESCRIPTION OF THE DRAWINGS

FIG. 5 is a partially schematic, side elevation view of an embodiment of the nozzle shown in FIGS. 3 and 4, installed beneath an aircraft wing in accordance with another embodiment of the invention.

FIGS. 6A-6C illustrate acoustic characteristics of an existing nozzle and a nozzle configured in accordance with an embodiment of the invention.

FIGS. 11A-11F illustrate geometric characteristics of nozzle projections that may be varied in accordance with further embodiments of the invention.

DETAILED DESCRIPTION

Aspects of the present disclosure are directed to nozzle exit configurations and associated systems and methods. Specific details of certain embodiments are described below with reference to FIGS. 2-14. Several details of structures or processes that are well-known and often associated with such methods and systems are not set forth in the following description for purposes of brevity. Moreover, although the following disclosure sets forth several embodiments of different aspects of the invention, several other embodiments of the invention can have different configurations or different components than those described in this section. Accordingly, the disclosure may have other embodiments with additional elements and/or without several of the elements described below with reference to FIGS. 2-14.

Figure 2:
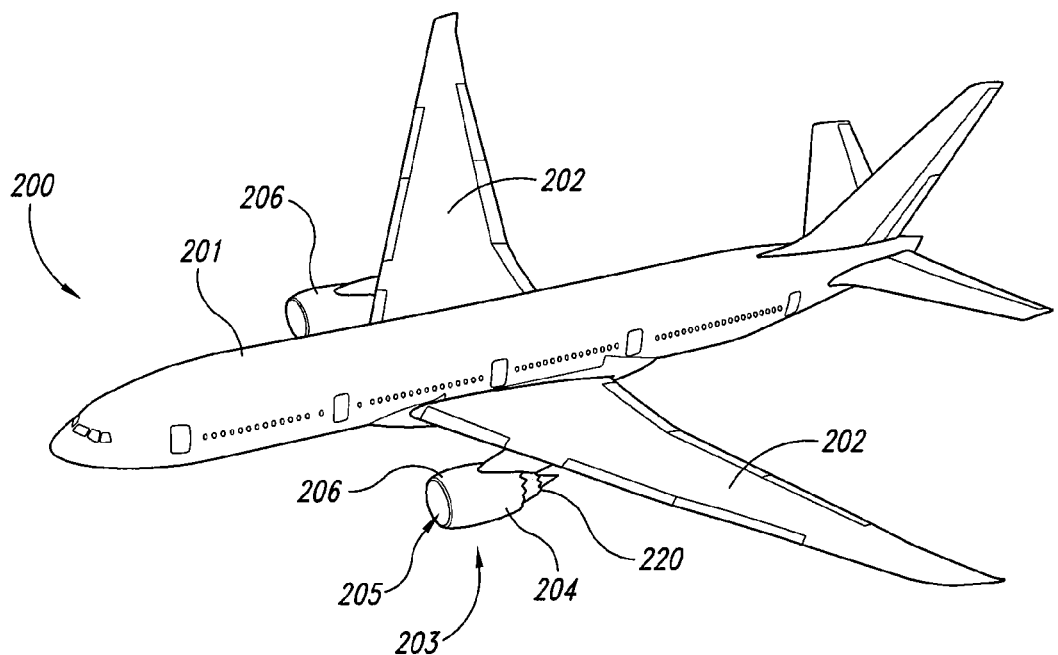
FIG. 2 illustrates an aircraft having a nozzle configured in accordance with an embodiment of the invention.

FIG. 2 is an illustration of a commercial jet transport aircraft 200 having wings 202, a fuselage 201, and a propulsion system 203. The illustrated propulsion system 203 includes two turbofan engines 206 carried by the wings 202. Each engine 206 is housed in a nacelle 204, which includes an inlet 205 and a nozzle 220. The nozzles 220 include particular features, discussed in greater detail below, that reduce and/or direct the noise generated by the engines 206 in a selected manner. As is also discussed below, the manner in which the noise is reduced and/or directed can depend upon a particular installation of the propulsion system 203. Accordingly, in other embodiments, the aircraft 200 can include a different number of engines and/or engines carried by different portions of the aircraft, along with nozzles 220 that are tailored to the particular installation.

Figure 3:
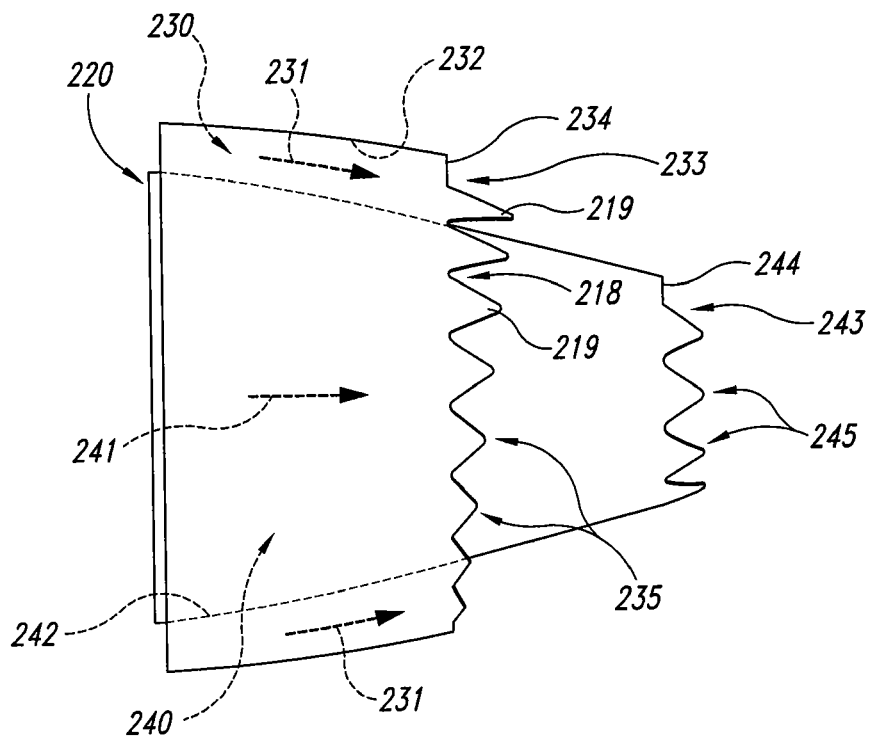
FIG. 3 is a partially schematic, side elevation view of a turbofan engine nozzle having projections arranged in accordance with an embodiment of the invention.

FIG. 3 is an enlarged side elevation view of an embodiment of the nozzle 220 as shown in FIG. 2. The nozzle 220 can include a fan flow duct 230 having a fan internal flow surface 232 that directs fan flow away from the upstream engine along a fan flow path 231. The nozzle 220 also includes a core flow duct 240 having a core internal flow surface 242 that directs the core flow away from the engine along a core flow path 241. The fan flow duct 230 terminates at a fan exit aperture 233 that is defined at least in part by a fan aperture perimeter 234 having multiple first or fan flow projections 235 that extend in an aft direction. Each of the fan flow projections 235 can have a generally triangular or chevron shape in a particular embodiment shown in FIG. 3, and can accordingly include aft or tip portions 219 that are spaced apart from each other by a gap 218. The fan flow projections 235 can have other shapes (e.g., trapezoidal or irregular) in other embodiments. As is also shown in FIG. 3, at least one geometric feature of the fan flow projections 235 changes in a generally monotonic manner along at least a portion of the fan aperture perimeter 234. For example, as shown in FIG. 3, the length of successive fan flow projections 235 changes in a circumferential direction around the fan aperture perimeter 234. As will be discussed in greater detail below, other features of the fan flow projections 235 may be changed in addition to, or in lieu of, the length of the projections.

As is also shown in FIG. 3, the core flow path 241 terminates at a core exit aperture 243 having a perimeter 244 with second or core flow projections 245. The core exit aperture 243 can be downstream of the fan exit aperture 233, as shown in FIG. 3, or it can have other locations relative to the fan exit aperture 233 (e.g., upstream) in other embodiments. In a particular embodiment shown in FIG. 3, the core flow projections 245 have geometric shapes and features that remain generally uniform around the perimeter 244 of the core exit aperture 243. In other embodiments discussed later with reference to additional Figures, the core flow projections 245 can have geometric features that vary around the perimeter 244. The manners in which the core flow projections 245 and/or the fan flow projections 235 vary can depend upon factors which can include the manner in which the nozzle 220 is mounted to an aircraft, the frequency range over which noise reduction is desired, and/or the region of the local environment in which the noise is to be reduced (e.g., the ground beneath the aircraft and/or the aircraft interior). The nozzle 220 can have either fan flow projections 235, core flow projections 245, or both. In at least some embodiments, the projections may extend around only a portion of the corresponding perimeter (e.g., with no projections on the remainder of the perimeter), and/or may have irregular spacings.

Figure 4:
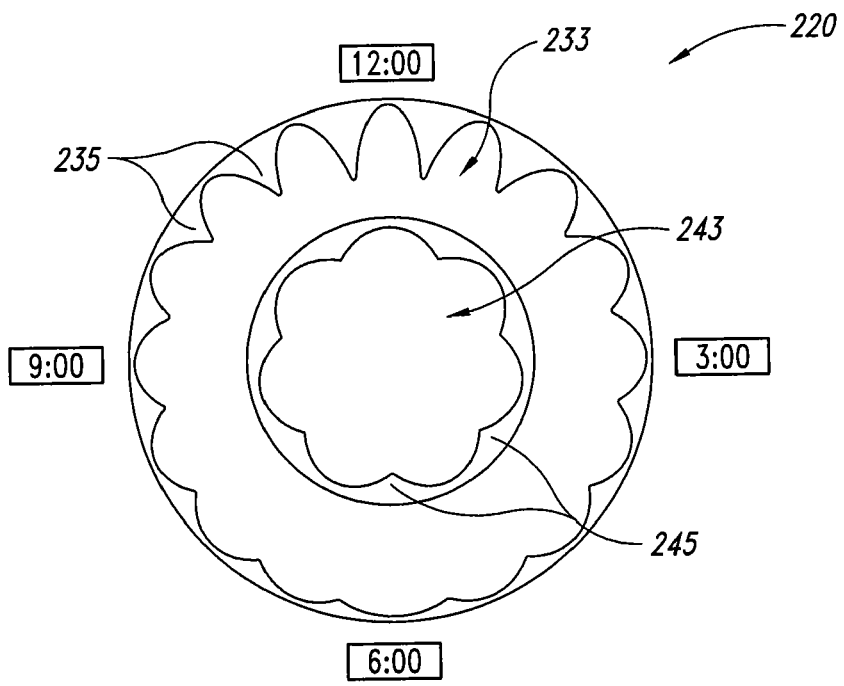
FIG. 4 is a partially schematic, rear elevation view of an embodiment of the nozzle shown in FIG. 3.

FIG. 4 is a forward-looking schematic view of the nozzle 220, schematically illustrating the fan flow projections 235 and the core flow projections 245. As shown in FIG. 4, the length of the fan flow projections 235 changes in a monotonic fashion from the 12:00 position to the 6:00 position in both clockwise and counterclockwise directions. Accordingly, the monotonic change of this geometric feature extends over 180° of the fan aperture perimeter 234 (e.g., opposite lateral halves of the nozzle 220 are generally symmetric). In other embodiments, the change can take place over a greater or lesser circumferential range. For example, the monotonic change may in some embodiments extend over a portion of the fan exit aperture 234 occupied by three fan flow projections 235. In still further embodiments, the monotonic variation can apply to groups or sets of fan flow projections 235.

For example, pairs of fan flow projections 235 (or core flow projections 245) may have characteristics that vary in a monotonic manner. Further details of one such arrangement are described below with reference to FIG. 11D. In any of these embodiments, the change in the geometric feature can result in an asymmetric nozzle 220.

FIG. 5 is a partially schematic, side elevation view of the nozzle 220 and the nacelle 204 installed on the wing 202. In this arrangement, the nacelle 204 is carried below the wing 202 and is supported by a pylon 207 relative to the wing 202. Accordingly, the fan flow projections 235 are longer toward the wing 202 than they are away from the wing 202, which can advantageously reduce nozzle noise without compromising thrust levels. In particular, the wing 202 can include movable trailing edge devices 208, such as flaps. The exhaust jet flow exiting the nozzle 220 can interact with the wing 202, and particularly with any trailing edge devices 208. This jet-flap interaction can increase the noise above that which is generated by the nozzle 220 alone. Such interactions can also occur between the downstream wake of the pylon 207 and the exhaust flow. Accordingly, it may be advantageous to encourage additional mixing between the nozzle flow and the adjacent freestream flow near the pylon 207 and near the lower surface of the wing 202, including near the trailing edge device 208 to reduce this jet-flap interaction.

The projections can enhance mixing between the jet flow and the ambient flow by introducing axial or streamwise vorticity generated by the pressure difference between the outwardly and inwardly facing surfaces of the fan flow projections 235. It is expected that by encouraging additional mixing in these regions, the flow velocity gradients, and/or the flow velocity magnitudes in these regions will be reduced, compared to levels that would be present without the enhanced mixing provided by the fan flow projections 235. The enhanced mixing that can lead to decreased turbulence intensity far away from the nozzle can also increase it near the nozzle. Accordingly, the elongated fan flow projections 235 can be concentrated in the region expected to provide an enhanced acoustic performance (e.g., toward the top of the nozzle 220). At the same time, the fan flow projections 235 positioned toward the bottom of the nozzle 220 can be smaller than those positioned toward the top. An expected benefit of this arrangement is that the smaller projections 235 near the bottom of the nozzle 220 impinge less into the flow exiting the nozzle 220 and accordingly have a reduced impact on the mass flow exiting the nozzle 220 and the turbulence intensity downstream near the bottom sector. As a result, the potential reduction in thrust created by the presence of the fan flow projections 235 and the potential increase in the turbulence intensity overall can be mitigated by having smaller fan flow projections 235 in those regions that may not be as important for sound reduction as are other regions.

Figure 1:
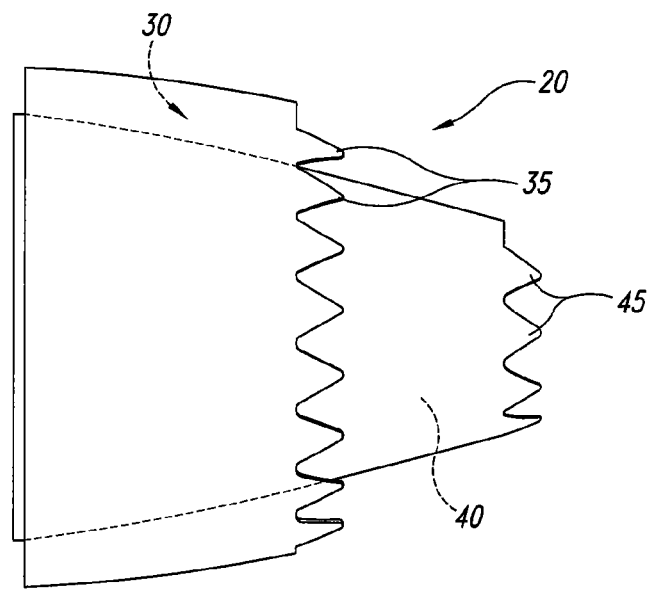
FIG. 1 schematically illustrates a nozzle configured in accordance with the prior art.

FIG. 6A schematically illustrates the effect described above. In this Figure, a thrust vector T and an acoustic intensity vector A are superimposed on a schematic illustration of the nozzle 220. The thrust vector T represents the direction and magnitude of the thrust produced by the nozzle 220, and the acoustic intensity vector A represents the direction and magnitude of the vector sum of far field acoustic intensities in the upper and lower hemispheres projected in the plane of the nozzle axis and the observer at a particular frequency or range of frequencies. For a nozzle having no projections, or uniform projections (such as are shown in FIG. 1), the thrust vector T and the acoustic intensity vector A are generally parallel but in opposite directions and generally axial. By tailoring the fan flow projections 235 in the manner shown in FIGS. 3-5, the acoustic intensity vector component directed toward the observer (assumed to be below the nozzle in FIG. 6A) can be reduced. This can be achieved by directing the acoustic intensity vector A effectively upward, thus reducing the downwardly directed component, or simply by reducing the magnitude of the acoustic intensity vector A without changing its direction. At the same time, the thrust vector T can remain axial. In fact, in a particular embodiment using this arrangement, the direction of the thrust vector T with the azimuthally varying fan flow projections 235 is identical or nearly identical to that associated with a nozzle having no projections.

FIGS. 6B and 6C compare measured acoustic test data proximate to an uninstalled baseline nozzle 20 generally similar to that shown in FIG. 1, with an uninstalled nozzle 220 generally similar to that shown in FIG. 3. At the particular frequency shown in these Figures (1223 Hz), the peak acoustic emission level at the source is reduced by approximately 1.4 dB, as is indicated graphically by the contour plots of constant sound level shown in these Figures. At the same time, the overall thrust vector direction is expected to be unchanged (e.g., axial), for the configuration shown in FIG. 6C, as compared with the baseline configuration shown in 6B. The thrust level for the configuration shown in FIG. 6C is expected to be at least very close to, if not equal to, the thrust level for the configuration shown in FIG. 6B. It is expected that the low impact of the circumferentially varying fan flow projections 235 on the thrust level may be due to the smaller projections 235 at the bottom perimeter of the nozzle 220 leading to a higher effective area of the nozzle. These projections tend not to extend into the nozzle exit flow by a great amount (e.g., they are not significantly immersed in the nozzle flow), and so have a reduced impact on nozzle mass flow rate, discharge coefficient and thrust. The foregoing results for noise reduction at the source are expected to also be significant for community noise reduction.

A comparison of acoustic data far away from the nozzle 220 (in the "far field") at low frequencies showed that the isolated nozzle 220 reduced noise compared to an isolated conventional round nozzle (with no projections) over a large sector of aft angles by about 3 to 4 dB at take-off, and by about 1.5 dB when compared to an isolated baseline nozzle 20 generally similar to that shown in FIG. 1. Under installed conditions, the range of observer angles and the frequencies over which the noise benefit attributed to the nozzle 220 is observed is reduced somewhat, impacting the overall noise benefit; however, embodiments of the installed nozzle 220 is still quieter than the baseline nozzle 20 (FIG. 1).

One feature of the foregoing embodiments described above with reference to FIGS. 3-6C is that azimuthally or circumferentially varying one or more geometric features of the fan flow projections 235 can reduce overall acoustic emissions from the engine, without an adverse or significantly adverse effect on engine thrust. In particular, relatively low frequency noise may be reduced and/or deflected away from observers on the ground. This noise is generally associated with jet-mixing interactions, for example, the type of mixing that occurs between the exhaust jet and the freestream flow, particularly adjacent to the pylon and the wing. The effect of reducing jet-wing and/or jet-pylon interaction noise can be particularly important on takeoff and approach, where community noise issues are a significant design factor. In particular, during takeoff, jet velocities are very high (although the trailing edge devices are typically not deployed by a great amount), while on landing, the trailing edge devices are deployed by a greater amount, while the jet exit velocities are not as high. In either embodiment, jet interaction noise can be a significant contributor to the overall acoustic signature of the aircraft, and can be reduced by a beneficial amount without a significant thrust penalty, as a result of projections having geometric features that vary circumferentially around the nozzle exit.

Another contributor to the overall acoustic signature of the aircraft is shockcell noise, which is typically associated with supersonic fan flow. Accordingly, shockcell noise may also be reduced by projections which diminish circumferential coherence and thereby weaken the shockcells addressed by the arrangement of the fan flow projections. In some cases, the core flow may also contribute to shockcell noise, in which case the second or core flow projections may be tailored, in addition to (or in lieu of) tailoring the fan flow projections.

Comparison of shockcell noise data between an embodiment of the nozzle 220 and a conventional round coaxial nozzle without projections (during a flight test at cruise conditions) showed a noise reduction of up to 5 dB on the exterior of the fuselage on the side where the engine was located. At the same time, the overall thrust vector direction between these two nozzles was unchanged, and the thrust level of the nozzle 220 actually increased slightly (0.65% at cruise) when compared to the conventional nozzle with no projections.

Figure 7:
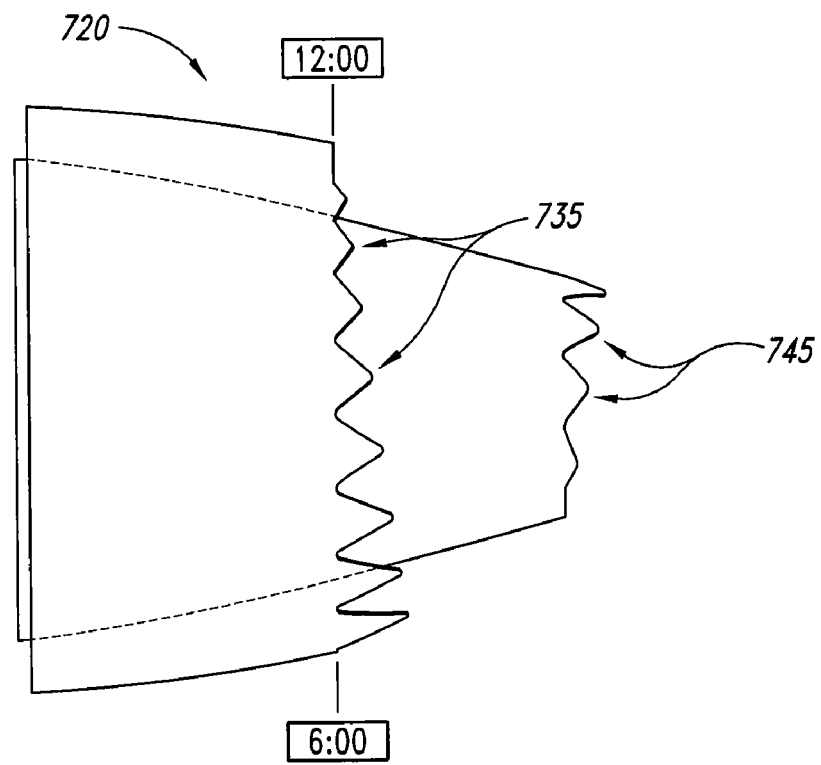
FIG. 7 is a partially schematic, side elevation view of a nozzle having projections at its exit that vary in accordance with another embodiment of the invention.
Figure 8:
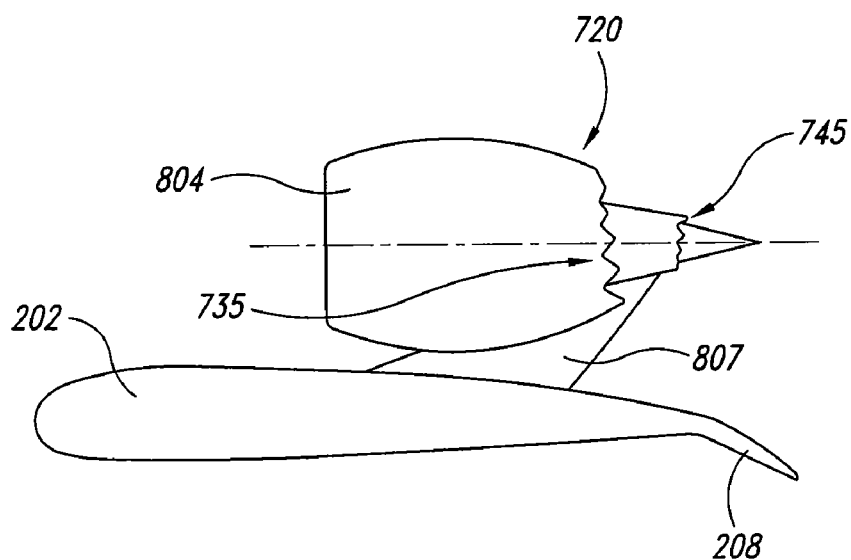
FIG. 8 is a partially schematic, side elevation view of an embodiment of the nozzle shown in FIG. 7 mounted to a wing in accordance with another embodiment of the invention.

FIG. 7 illustrates a nozzle 720 having first or fan flow projections 735 and second or core flow projections 745. The fan flow projections 735 and the core flow projections 745 vary in monotonic, opposite manners. That is, the fan flow projections 735 tend to be longer toward the bottom of the nozzle 720 than toward the top of the nozzle 720, while the core flow projections 745 vary in the opposite manner. The variation of the fan flow projections 735 is the opposite of the arrangement of fan flow projections 235 shown in FIG. 3. Accordingly, this arrangement may be suitable when the nozzle 720 is carried by a pylon extending downwardly (rather than upwardly) from the engine. Such an arrangement is shown in FIG. 8. In particular, FIG. 8 illustrates the wing 202 with an upper surface mounted pylon 807 carrying a nacelle 804 housing the nozzle 720. In this arrangement, the trailing edge devices 208 deploy downwardly (in a typical fashion) and, therefore, may not contribute significantly to the jet-flap interaction noise described above. However, the downstream wake of the pylon 807 may interact with the exhaust products and accordingly, it may be advantageous to have the fan flow projections 735 be longer in a region adjacent to the pylon 807, than in a region distant from the pylon 807.

Figure 9A:
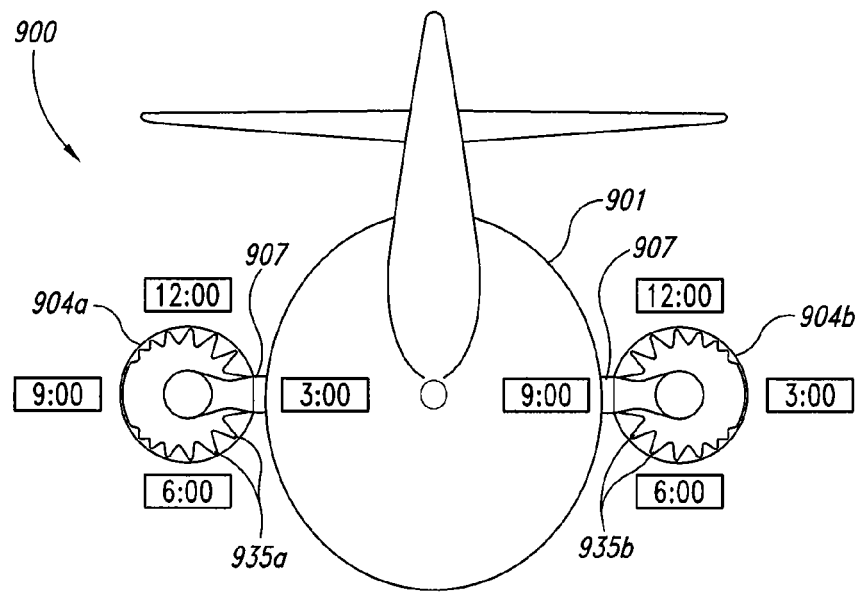
FIG. 9A is a partially schematic, rear elevation view of two nozzles mounted proximate to an aircraft fuselage, each having exit projections that vary in accordance with another embodiment of the invention.
Figure 9B:
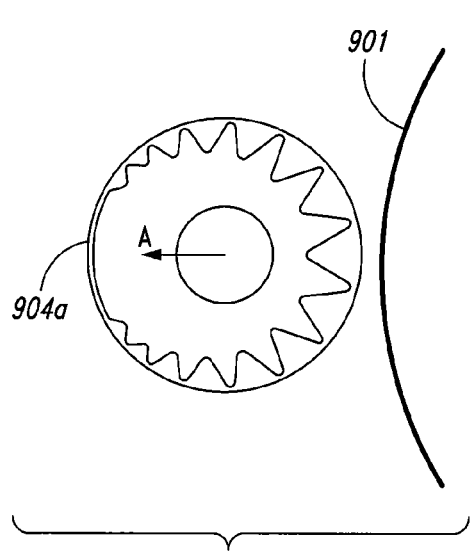
FIGS. 9B-9D are schematic illustrations of acoustic intensity vectors corresponding to nozzles configured in accordance with still further embodiments of the invention.

FIG. 9A illustrates an aircraft 900 having two engine nacelles 904a, 904b that depend from or are at least proximate to the fuselage 901. In this particular embodiment, each of the engine nacelles 904a, 904b is carried by the fuselage 901 via a corresponding pylon 907. The nacelles 904a, 904b can include fan flow projections 935a, 935b that are configured to reduce the noise transmitted to the interior of the fuselage 901 (e.g., the passenger compartment). In particular, the fan flow projections 935a, 935b can be longer at a position close to the fuselage 901 than they are in a position distant from the fuselage 901. As a result, the fan flow projections 935a on the left nacelle 904a tend to be longest near the 3:00 position, and shortest near the 9:00 position, while the fan flow projections 935b on the second nacelle 904b have the opposite arrangement. It is expected that the enhanced mixing provided by the longer fan flow projections 935a, 935b near the fuselage 901 (which may have relatively greater immersion into the flow) can reduce the acoustic signature close to the fuselage 901, and can accordingly reduce the sound level experienced by passengers within the passenger compartment. The fan flow projections 935a, 935b that are more distant from the fuselage 901 can be shorter so as to reduce the overall effect of the fan flow projections 935a, 935b on engine thrust. FIG. 9B illustrates an acoustic intensity vector A corresponding to the sound level expected to be produced by the left nacelle 904a at a given frequency. In particular, the net acoustic intensity vector A points outwardly away from the fuselage 901, indicating that sound levels are expected to be lower near the fuselage 901 than distant from the fuselage 901.

The manner in which the geometric features of the projections vary around the perimeter of the nozzle can be selected to have a wide variety of effects, and different feature changes can be superimposed so as to address different acoustic requirements simultaneously. While superimposing different feature changes may not necessarily result in an optimum level of noise reduction for each requirement, the combination may be one that results in an overall noise reduction that meets multiple design requirements. For example, the longer fan flow projections 235 positioned toward the top of the nozzle (described above with reference to FIG. 3) may be combined with the longer projections 935a, 935b positioned toward the inboard side of the nozzle (described above with reference to FIG. 9A). The result may be fan flow projections having an increased length toward the top of the nozzle to reduce jet-flap interaction noise, and also longer toward the fuselage to reduce cabin noise. The projections may be shorter toward the bottom of the nozzle and toward the side of the nozzle away from the fuselage, so as not to significantly impact the overall exhaust product mass flow and thrust level, in a region of the nozzle where reduced acoustic signature may not be as important as it is near the fuselage and near the wing.

Figure 9C:
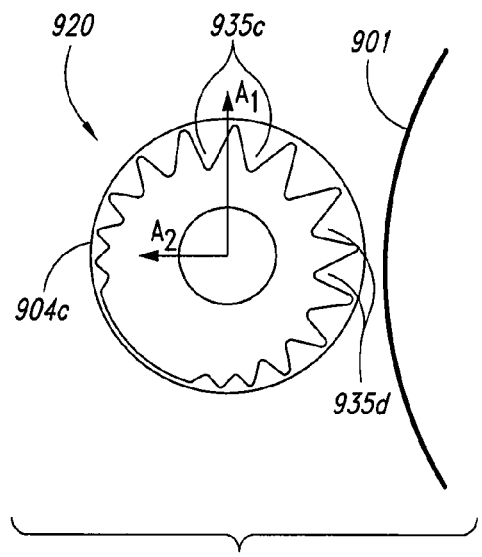

FIG. 9C schematically illustrates a nacelle 904c and nozzle 920 having projections configured to meet multiple acoustic objectives in the manner described above. In particular, longer projections 935c toward the top of the nozzle 920 are positioned to reduce jet-mixing noise (e.g., due to an overhead wing and/or pylon), as represented by a first acoustic radiation vector A1. Longer projections 935d toward the inboard side of the nozzle 920 are positioned to reduce shockcell noise, as represented by a second acoustic vector A2.

Figures 9D, 10:
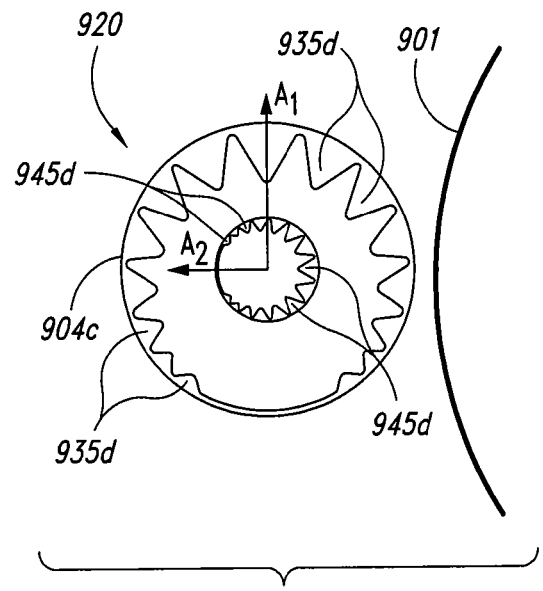
FIG. 10 is a schematic illustration representative of nozzle projection variations in accordance with several embodiments of the invention.

FIG. 9D schematically illustrates a nozzle 920 configured in accordance with another embodiment of the invention to include two types of azimuthally varying projections: fan flow projections 935d that are longer and/or more immersed toward the top of the nozzle (near the pylon), and core flow projection 945d having monotonically decreasing lengths in a direction away from the fuselage 901. It is expected that this arrangement can reduce both community noise at low frequencies and shockcell/cabin noise at higher frequencies.

In still further embodiments, the manner in which the projections vary around the nozzle perimeter (and therefore the degree of mixing between the adjacent flows) can be changed depending on flight regime of the aircraft, by changing the degree to which the projections are immersed as a function of time. This arrangement can be used to reduce different spectra of noise in different flight regimes. For example, to obtain more mixing between the fan flow and the freestream air near the pylon (e.g., to reduce low-frequency noise during takeoff), the projections near the pylon can be actively bent inwardly during takeoff. If mid-frequency shockcell noise at cruise is reduced by another type of azimuthal variation, (e.g., by immersing projections near the fuselage by a greater amount than projections away from the fuselage), then this change can be made during the appropriate flight regime (e.g., during cruise). Such desired azimuthal variations in projection immersions can be obtained, for example, by using shape memory alloys inside the projections and suitable heat control elements. This arrangement can be applied to fan flow projections, and/or core flow projections. Further aspects of active systems for accomplishing this variation are included in U.S. Pat. No. 6,718,752, incorporated herein by reference.

As discussed above, certain aspects of the manners by which projection geometric features are varied can be combined in a wide variety of ways. FIG. 10 illustrates schematically representative features that may be applied to the fan flow projections (along the horizontal axis), and/or the core flow projections (along the vertical axis). In these illustrations, R refers to regular or baseline projections that do not vary circumferentially, T refers to projections that are longer toward the top than the bottom, B refers to projections that are longer toward the bottom than the top, K refers to an arrangement in which projections are longer toward the top and the bottom, and V refers to an arrangement in which the immersion or degree to which the projections are bent inwardly toward the flow varies around the circumference of the nozzle, but the length does not. Depending upon the desired acoustic signature and the particular installation in which the nozzle is placed, these features may be combined in any of a variety of manners.

Figure 11E:
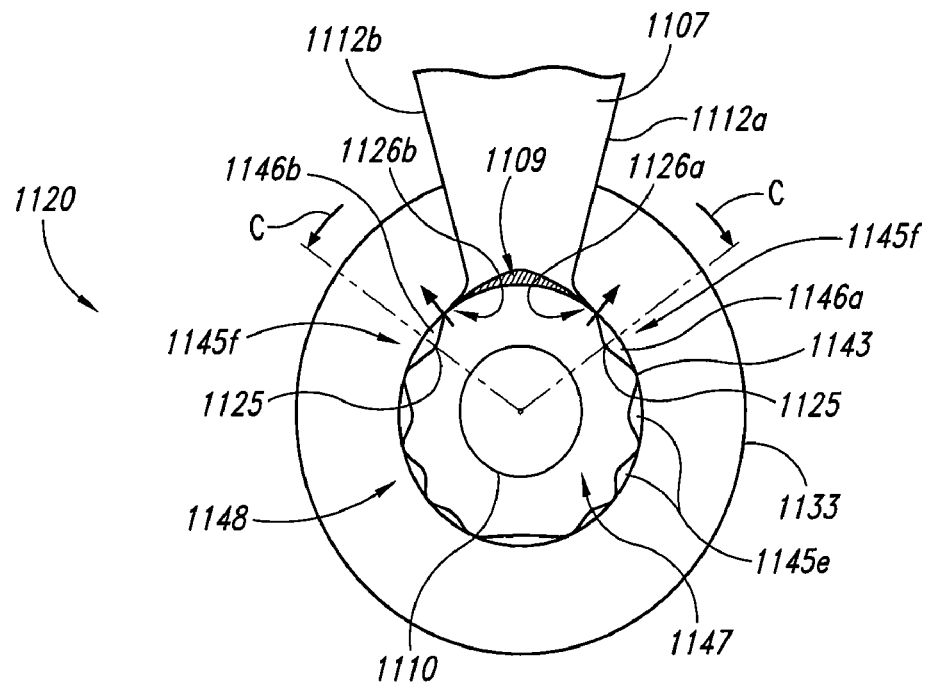

FIGS. 11A-11F illustrate representative features of individual projections 1135 that may be varied in accordance with particular embodiments of the invention. For example, FIG. 11A illustrates multiple projections 1135 located at a perimeter 1121 of a corresponding nozzle 1120. Geometric features of each projection 1135 that can be varied include the length 1122 of the projection 1135, the width 1123 of the projection 1135, and/or the apex angle 1124 of the projection 1135. The overall shape of the projection 1135 may also be varied. For example, the projections 1135 can have a triangular or chevron shape as shown in FIG. 11A, with generally sharp vertices, or the projections 1135 may have other shapes and/or shapes with rounded or other less abrupt transitions between edges. The number of projections 1135 per unit length of the perimeter 1121 is another variable that may be selected to have the desired effect on the acoustic signature, again depending upon the particular installation. As shown in FIG. 11B, the angle 1125 between the projection 1135 and the flow surface located just upstream of the projection 1135, or the curvature of the projection 1135, can also be varied so as to vary the immersion or degree to which the projection 1135 is deflected or bent inwardly into the nozzle flow. As shown in FIG. 11C, the density of projections 1135 (e.g., the number of projections 1135 per unit length along the nozzle exit perimeter) can also be varied. As noted above, in particular embodiments, there may be portions of the nozzle perimeter or circumference without projections, and/or the gap spacing between projections may vary in an irregular manner.

Many of the foregoing factors may be varied in combination with each other to produce a desired geometry. For example, if each projection 1135 has a fixed width 1123, then reducing the length 1122 of the projection 1135 will change the apex angle 1124. In at least some embodiments, the projections 1135 form part of an inwardly-sloping body of revolution around the axial centerline of the nozzle. Accordingly, longer projections 1135 will tend to be more immersed in the nozzle flow than shorter projections. In other embodiments the projections can be deflected outwardly away from the nozzle centerline, as opposed to inwardly toward the nozzle centerline. Similar considerations can be applied to determine the geometric features of such projections.

In a particular embodiment shown in FIG. 11D, at least some adjacent projections can be alternately immersed inwardly and outwardly (e.g., by the same amount or by different amounts). Accordingly, the nozzle 1120 can include pairs of inwardly deflected projections 1135a and outwardly deflected projections 1135b. The vortices from the adjacent edges of an inwardly deflected projection 1135a and a neighboring outwardly deflected projection 1135b tend to merge to form only one axial vortex from those adjacent edges. Thus, for all practical purposes, each pair of alternately immersed projections can act like one projection having a larger combined width and a stronger axial vorticity. The parameters described above for obtaining azimuthal variation of mixing with respect to individual neighboring projections can also apply to each pair taken as a unit. For example, in order to obtain a monotonic variation in mixing from the top of the nozzle 1120 to the bottom of the nozzle 1120 the projections 1135a, 1135b can have a monotonically decreasing level of immersion (inwardly for the inwardly deflected projections 1135a and outwardly for the outwardly deflected projections 1136b) from top to bottom. In other embodiments, other geometric characteristics of the projection pairs can be varied.

FIG. 11E illustrates a nozzle 1120 configured in accordance with another embodiment of the invention. The nozzle 1120 is positioned proximate to a pylon 1107 (a portion of which is visible in FIG. 11E), which in turn includes a heat shield 1109 to protect the pylon 1107 from hot exhaust gases in an exhaust core flow 1147. The nozzle 1120 includes a fan exit aperture 1133 (through which a fan flow 1148 passes) and a core exit aperture 1143 (through which the core flow 1147 passes) which may be positioned annularly around a nozzle plug 1110. The core exit aperture 1143 can include first core flow projections 1145e and second core flow projections 1145f. The second core flow projections 1145f are positioned proximate to the heat shield 1109 and can be longer and/or more immersed in the core flow than the first core flow projections 1145e. It is expected that this arrangement will increase mixing between the (relatively hot) core flow 1147 and the (cooler) fan flow 1148, thereby reducing the temperature at the sides of the pylon 1107, as discussed in greater detail below. The fan exit aperture 1133 can include no projections, as shown in FIG. 11E, or in other embodiments, it can include fan flow projections having any of the characteristics described above.

In a particular aspect of the arrangement shown in FIG. 11E, the pylon 1107 can include a first side 1112a facing in a first direction, and a second side 1112b facing in generally the opposite direction. The heat shield 1109 can be generally positioned adjacent to the downwardly facing portion of the pylon, and can terminate at the sides 1112a, 1112b of the pylon 1107. Accordingly, the outer edges of the heat shield 1109 can be generally aligned with the first and second sides 1112a, 1112b of the pylon 1107. The lower portion of the pylon 1107 and/or the heat shield 1109 can be slightly flared in an outward direction, as shown in FIG. 11E, or it can include no flare or a greater amount of flare in other embodiments.

The second core flow projections 1145f can include a first pylon projection 1146a and a second pylon projection 1146b (e.g., "corner projections" or "pylon projections") that have particular orientations, configurations, and/or locations relative to features of the pylon 1107, including (but not limited to) the sides 1112a, 1112b and/or the heat shield 1109. Each of the pylon projections 1146a, 1146b can include a tip 1125, e.g. a point or a rounded tip or region of the projection that extends further aft than the rest of the projection, and/or is more immersed in the core flow than the rest of the projection. The pylon projections 1146a, 1146b can also include inner roots or valleys 1126a, 1126b that are offset circumferentially and axially forward of the tip 1125. In a particular aspect of an arrangement shown in FIG. 11E, the inner roots or valleys 1126a, 1126b of the pylon projections 1146a, 1146b are generally aligned circumferentially with the edges of the heat shield 1109 and/or the first and second sides 1112a, 1112b, respectively, of the pylon 1107. Accordingly, the corresponding tips 1125 of the pylon projections 1146a, 1146b are offset outwardly in opposite directions away from the first side 1112a and the second side 1112b, respectively, as indicated by dashed lines and arrows C in FIG. 11E. As discussed above, it is expected that in at least some arrangements, the increased immersion of the pylon projections 1146a, 1146b in the core flow, compared with the first core flow projections 1145e, can enhance vorticity and mixing with fan flow air in the region of the pylon 1107 and the heat shield 1109, and can accordingly reduce the degree to which one or both of these components are exposed to the high temperature core flow gases.

Figure 11F:
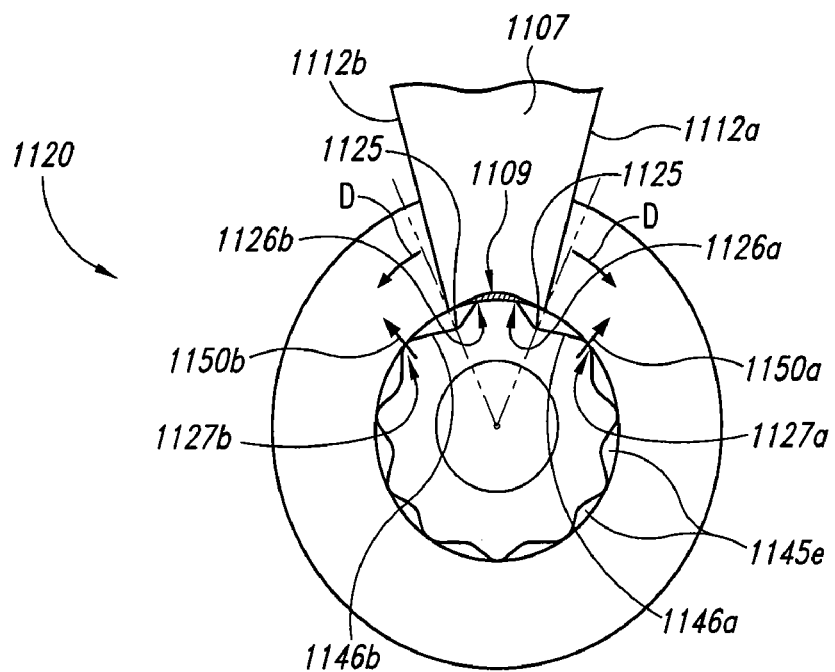

In other arrangements, the pylon projections 1146a, 1146b can have other configurations and/or locations relative to the pylon 1107. For example, referring now to FIG. 11F, the first and second pylon projections 1146a, 1146b each include a tip 1125 that is generally aligned circumferentially with the corresponding pylon sides 1112a, 1112b, and/or the edges of the heat shield 1109. Accordingly, outer valleys or roots 1127a, b of the pylon projections 1146a, 1146b can be offset outwardly from the pylon sides 1112a, 1112b. It is expected that in at least some embodiments (e.g., when the heat shield 1109 is unflared, as shown in FIG. 11F), this arrangement can further reduce the exposure of components of the pylon 1107 to high temperatures because hot core flow components 1150a, 1150b can escape radially outwardly from the outer valleys 1127a, b, respectively, and are located circumferentially away from the pylon sides 1112a, 1112b as indicated by arrows D. Accordingly, this arrangement can further reduce the likelihood for hot core flow to scorch or otherwise heat the pylon sides 1112a, 1112b. The positions of the tips 1125 and/or the roots 1126a, 1126b, 1127a, 1127b can be identified by distance (e.g., an arc length), an angle (e.g., relative to a 12:00 position), or other suitable measures.

In a particular aspect of an arrangement shown in FIG. 11F, the pylon projections 1146a, 1146b can be individually asymmetric. That is, each of the projections 1146a, 1146b can have a greater circumferential extent in one direction from the tip 1125 than in the other. For example, the second pylon projection 1146b can extend inwardly toward the pylon 1107 by a shorter distance than it extends outwardly away from the pylon 1107. In other embodiments, the pylon projections 1146a, 1146b can be asymmetric in other manners, e.g. extending inwardly toward the pylon 1107 by a greater distance than they extend outwardly away from the pylon 1107, or they can be generally symmetric, as shown in FIG. 11E. The degree of symmetry or asymmetry can be selected based on the configuration of the pylon 1107 and/or the heat shield 1109. In general, the first and second pylon projections 1146a, 1146b can be mirror images of each other, e.g. reflected about a plane that passes vertically through the center of the nozzle 1120. In other arrangements, the pylon projections 1146a, 1146b can be asymmetric relative to each other, again depending upon the particular features of the pylon 1107 and/or the heat shield 1109. The pylon projections 1146a, 1146b can be axially aligned with the flow direction of the core exhaust, or they can have other orientations (e.g., twisted shapes) that can, in at least some instances, further enhance fan flow entrainment. The remaining projections (e.g. the first core flow projections 1145e) can have geometric features that change in a generally monotonic manner around at least a portion of the nozzle perimeter, in any of the manners described herein.

As discussed above, an advantage of pylon projections 1146a, 1146b having any one or combination of the features described above is that they can reduce the exposure of the pylon sides 1112a, 1112b and/or the heat shield 1109 to heat from the exhaust core flow, while the remaining projections produce enhanced noise reduction. In particular embodiments, this effect can be achieved by entraining additional by-pass air from the adjacent by-pass air flow path, and/or by increasing vorticity in the region adjacent to the pylon 1107. This effect can be of increased importance during cross-wind conditions, when the hot core flow exhaust may have an increased effect in a lateral direction, and hence an increased effect on the pylon 1107.

In a particular embodiment, the foregoing characteristics can be used to configure the pylon projections 1146a, 1146b and the heat shield 1109 in an interdependent manner. For example, the pylon chevrons 1146a, 1146b can be selected to have a particular configuration (e.g. location, position, and/or geometry), and the heat shield 1109 can be configured to provide sufficient heat protection to the pylon 1107 in light of the expected flow characteristics produced by the pylon projections 1146a, 1146b. The configurations of both elements can then be adjusted in an interdependent manner to produce a design that results in both adequate heat protection for the pylon 1107, and adequate sound attenuation for the overall flow produced by the nozzle 1120. The particular solution selected as a result of the foregoing design method can also be chosen to produce the lowest weight configuration or can be selected to emphasize other desirable characteristics. An advantage of this design methodology is that it recognizes and can exploit the interdependency of these geometric features.

Figure 12:
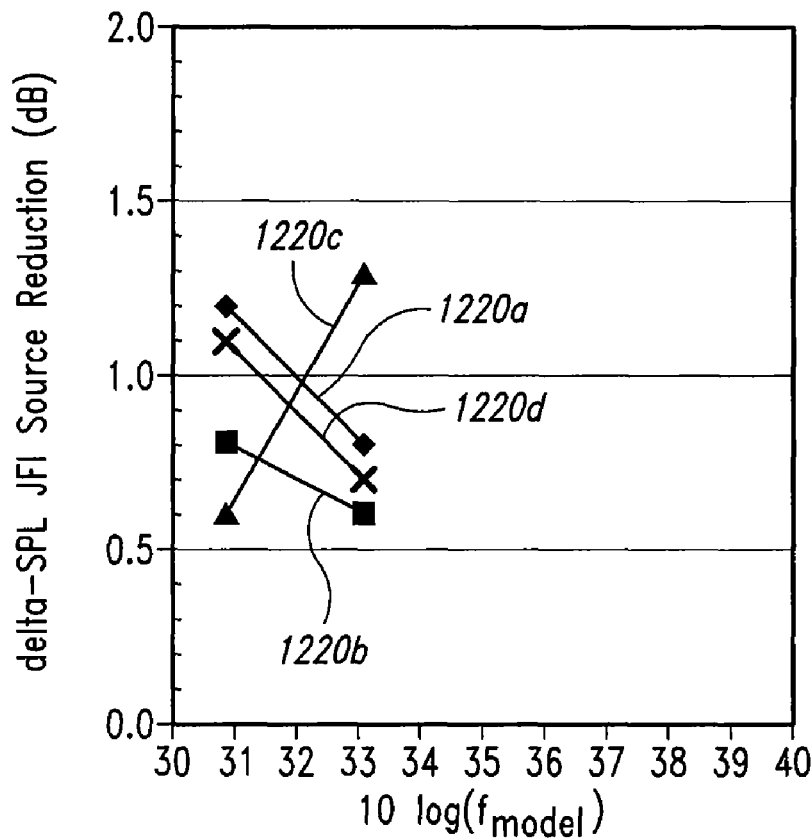
FIG. 12 is a graph illustrating an expected effect of nozzle projection variation on sound attenuation at a variety of frequencies.
Figure 12:
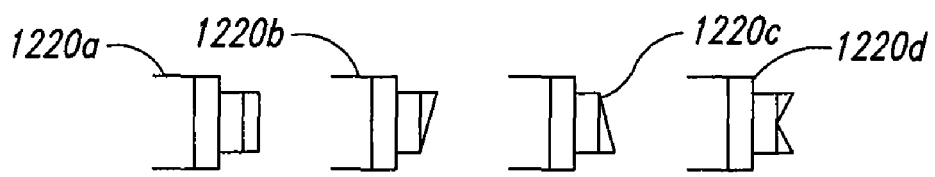
Figure 12:

FIG. 12 is a schematic illustration of four nozzles, labeled 1220a-d, each of which has core flow projections with a different configuration, in accordance with several embodiments. For example, nozzle 1220a has core flow projections that do not vary in a circumferential direction, nozzle 1220b has core flow projections that are longer at the top than at the bottom, nozzle 1220c has the opposite arrangement, and nozzle 1220d has core flow projections that are longer at the top and bottom and shorter in an intermediate region. In this particular embodiment, the fan flow projections for each of these nozzles are uniform. The graph of FIG. 12 illustrates the level of jet-flap interaction noise reduction associated with each of the nozzle configurations 1220a-d, as a function of frequency (on a logarithmic scale) compared to a simple round coaxial nozzle with no projections. Nozzles 1220a, b, d each reduce noise by a lesser amount at higher frequencies than at lower frequencies. By contrast, nozzle 1220c has a greater noise reduction capability at higher frequencies than at lower frequencies. FIG. 12 accordingly indicates that the manner in which the geometric feature varies around the perimeter of the nozzle may be selected based (at least in part) on the frequency of the noise that is to be reduced. If lower frequency noise is to be reduced, nozzles 1220a, b or d may be appropriate, and if higher frequency noise is to be reduced, nozzle 1220c may be more appropriate. Typically, community noise is a greater problem at lower frequencies than at higher frequencies, while cabin noise is typically a greater problem at higher frequencies than at lower frequencies. Accordingly, the appropriate arrangement of nozzle projections (or combination of nozzle projection arrangements) can be selected in a manner that depends on the particular noise reduction target. Similar noise reduction trends as a function of frequency were found for nozzles having varying fan flow projections and uniform core flow projections; however, in at least some of these cases, the reduction in the noise that is due to jet-flap interaction was higher than for the (baseline) nozzle 1220*a*.

Figure 13A:
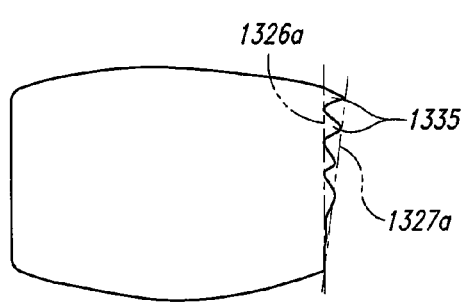
FIGS. 13A-C illustrate projections arranged in accordance with still further embodiments of the invention.
Figure 13B:
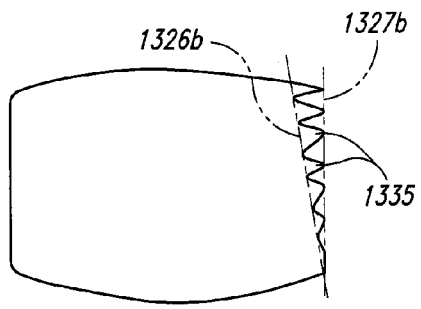
Figure 13C:
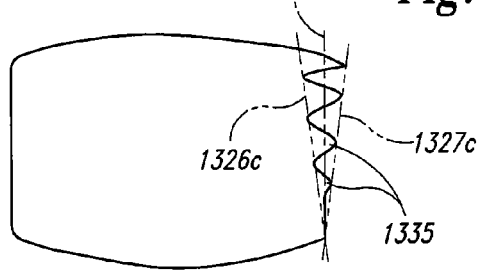

FIGS. 13A-C and 14 illustrate still further geometric features that may be varied to achieve desired thrust and acoustic signature results in accordance with further embodiments of the invention. In particular, FIGS. 13A-13C illustrate nozzles having different root locus lines 1326 (shown as root locus lines 1326*a*-1326*c*) and tip locus lines 1327 (shown as tip locus lines 1327*a*-1327*c*). The root locus lines 1326*a*-1326*b* connect the root locations of successive fan flow projections 1335, and the tip locus lines 1327*a*-1327*c* connect the tip locations of the same projections 1335. FIG. 13A illustrates a generally vertical root locus line 1326*a* and an aft-canted tip locus line 1327*a*. FIG. 13B illustrates a forwardly-canted root locus line 1326*b* and a generally vertical tip locus line 1327*b*. FIG. 13C illustrates a forwardly-canted root locus line 1326C, an aft-canted tip locus line 1327*c*, and a generally vertical centroid locus line 1328*c*. The appropriate orientation of the root and tip locus lines may be selected to produce the desired acoustic vector, thrust vector, and/or other appropriate parameter. For example, canting the root locus line 1326 and/or the tip locus line 1327 may cant the thrust vector. If a particular azimuthal arrangement of projections 1335 shifts the thrust vector in an undesirable manner, canting the root locus line 1326 and/or the tip locus line 1327 can be used to correct the thrust vector back to the desired orientation. This methodology is illustrated in the context of fan flow projections, but may be applied to core flow projections in addition to or in lieu of the fan flow projections.

Figure 14:
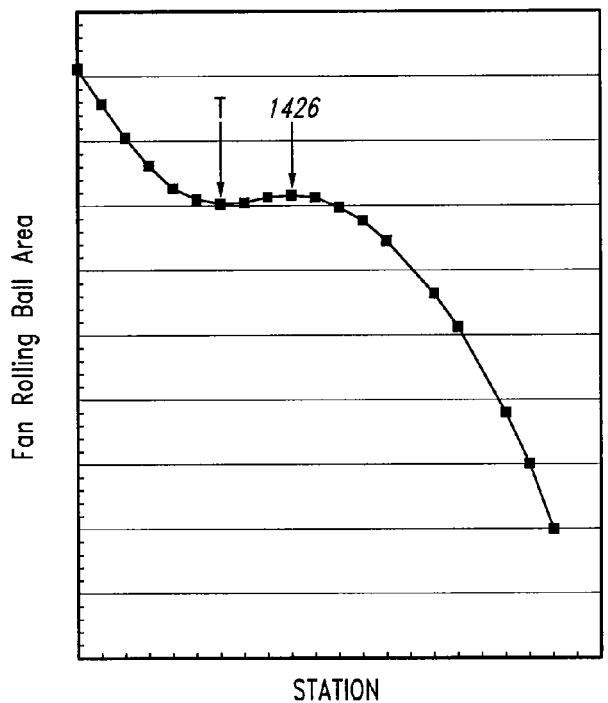
FIG. 14 is a schematic illustration of a nozzle gas path flow area in accordance with an embodiment of the invention.

FIG. 14 illustrates the "rolling ball" flow area through the fan flow duct of a nozzle configured in accordance with another embodiment of the invention. FIG. 14 illustrates that the nozzle has a locally convergent-divergent arrangement, with a geometric throat T upstream of a corresponding root locus line 1426. This arrangement is expected to have several beneficial effects. For example, a local convergent-divergent region of the nozzle is expected to have enhanced aerodynamic effects at particular flight regimes. By positioning the geometric throat T upstream of the root locus line 1426, the effective exit area of the nozzle can be controlled such that it does not become susceptible to fan instability problems at low nozzle pressure ratios of the fan stream. The latter can occur when using inwardly immersed fan flow projections which can aerodynamically effectively behave like convergent nozzles. The shape of the projections that controls the local convergent-divergent behavior of the rolling ball area can be used to control the effective exit area and avoid fan instabilities. It is expected that this arrangement can reduce thrust degradation. It will be understood that in at least some cases, the nozzle can include an aerodynamic convergent section downstream of the local convergent-divergent region discussed above.

From the foregoing, it will be appreciated that specific embodiments of the invention have been described herein for purposes of illustration, but that various modifications may be made without deviating from the invention. For example, several of the embodiments described above were described in the context of nozzles having core flow paths that extend axially further aft than the corresponding fan flow paths (e.g., externally mixed nozzles). In other embodiments, the nozzles may be internally mixed and may have fan flow paths that extend further aft than the corresponding core flow paths. The nozzles may have a variety of exit perimeter shapes, including round, rectangular and elliptical.

Still further embodiments are described in the following documents, all of which are incorporated herein by reference: AIAA Paper 2001-2185, entitled "Computational Analysis of a Pylon-Chevron Core Nozzle Interaction, dated May 28-30, 2001; AIAA Paper 2004-2827 entitled "Jet Pylon Interaction of High Bypass Ratio Separate Flow Nozzle Configurations"; AIAA Paper 2006-2467, entitled "Reducing Propulsion Airframe Aeroacoustic Interactions with Uniquely Tailored Chevrons: 1. Isolated Nozzles," dated May 8-10, 2006; AIAA Paper 2006-2434, entitled "Reducing Propulsion Airframe Aeroacoustic Interactions with Uniquely Tailored Chevrons: 2. Installed Nozzles," dated May 8-10, 2006; AIAA Paper 2006-2435, entitled "Reducing Propulsion Airframe Aeroacoustic Interactions with Uniquely Tailored Chevrons: 3. Jet-Flap Interaction," dated May 8-10, 2006; AIAA Paper 2006-2439, entitled "Flight Test Results for Uniquely Tailored Propulsion-Airframe Aeroacoustic Chevrons: Shockcell Noise," dated May 8-10, 2006; AIAA Paper 2006-2438, entitled "Flight Test Results for Uniquely Tailored Propulsion-Airframe Aeroacoustic Chevrons: Community Noise," dated May 8-10, 2006; AIAA Paper 2006-2436, entitled "Computational Analysis of a Chevron Nozzle Uniquely Tailored for Propulsion Airframe Aeroacoustics," dated May 8-10, 2006; AIAA Paper 2005-0996, entitled "Relative Clocking of Enhanced Mixing Devices for Jet Noise Benefit," dated Jan. 10-13, 2005; AIAA Paper 2005-2934, entitled "Jet Noise Characteristics of Chevrons in Internally Mixed Nozzles," dated May 23-25, 2005; and AIAA Paper 2006-0623, entitled "Internal Flow and Noise of Chevrons and Lobe Mixers in Mixed-Flow Nozzles," dated Jan. 9-12, 2006.

Aspects of the disclosure described in the context of particular embodiments may be combined or eliminated in other embodiments. For example, many of the geometric features described individually above may be combined in any of a variety of manners to meet corresponding acoustic and thrust design goals, while integrating appropriately with other structures of the aircraft into which the nozzles are integrated. Further, while advantages associated with certain embodiments of the disclosure have been described in the context of those embodiments, other embodiments may also exhibit such advantages, and not all embodiments need necessarily exhibit such advantages to fall within the scope of the disclosure.

We claim:

1. An aircraft system, comprising:
    a pylon having a first side, a second side facing opposite the first side, and a heat shield having a first edge proximate to the first side of the pylon and a second edge proximate to the second side of the pylon; and
    a jet engine exhaust nozzle carried by the pylon and having an internal flow surface adjacent a hot exhaust flow path, the internal flow surface having an exit aperture with a perimeter that includes multiple projections extending in an aft direction and circumferentially spaced about the perimeter, with a geometric feature of the multiple projections changing in a monotonic manner along at least a portion of the perimeter, wherein a first projection nearest the first side of the pylon and a second projection nearest the second side of the pylon are both oriented inwardly into the flow path by a greater amount than the remaining projections, and wherein at least a portion of the first projection is positioned circumferentially outwardly from the first edge of the heat shield and at least a portion of the second projection is positioned circumferentially outwardly from the second edge of the heat shield.

2. The system of claim 1 wherein at least a portion of the first projection is positioned circumferentially outwardly from the first side of the pylon and at least a portion of the second projection is positioned circumferentially outwardly from the second side of the pylon.

3. The system of claim 1 wherein:
each of the first and second projections has a generally triangular shape with a root and a tip;
the root of the first projection has a first orientation relative to the first side of the pylon; and
the root of the second projection has a second orientation relative to the second side of the pylon that generally mirrors the first orientation.

4. The system of claim 3 wherein the root of the first projection is offset from the first side of the pylon by a first value in a first direction, and wherein the root of the second projection is offset from the second side of the pylon by a second value generally the same as the first value in a second direction generally opposite the first direction.

5. The system of claim 4 wherein the root of the first projection is offset from the first side of the pylon by a first angle in a first direction, and wherein the root of the second projection is offset from the second side of the pylon by a second angle generally the same as the first angle in a second direction generally opposite the first direction.

6. The system of claim 4 wherein the root of the first projection is offset from the first side of the pylon by a first distance in a first direction, and wherein the root of the second projection is offset from the second side of the pylon by a second distance generally the same as the first distance in a second direction generally opposite the first direction.

7. The system of claim 3 wherein the tip of the first projection is offset from the first side of the pylon by a first value in a first direction, and wherein the tip of the second projection is offset from the second side of the pylon by a second value generally the same as the first value in a second direction generally opposite the first direction.

8. The system of claim 3 wherein the tip of the first projection is circumferentially aligned with the first side of the pylon and wherein the tip of the second projection is circumferentially aligned with the second side of the pylon.

9. The system of claim 1 wherein the first projection is inclined radially inwardly into the flow by a greater amount than is a neighboring projection located circumferentially outwardly from the first projection.

10. The system of claim 1 wherein the first projection has a greater axial extent than does a neighboring projection located circumferentially outwardly from the first projection.

11. The system of claim 1 wherein the exhaust nozzle includes a fan flow path positioned radially outwardly from the internal flow surface.

12. A method for operating an aircraft engine, comprising:
directing a flow of hot exhaust gas from an aircraft engine through an exhaust nozzle exit aperture, the aperture having a perimeter with axially extending projections arranged around the perimeter, and with a geometric feature of the projections changing in a monotonic manner along at least a portion of the perimeter; and
controlling the flow of hot exhaust gas near a pylon supporting the engine by directing the flow adjacent to first and second projections located at least partially outwardly from and nearest to first and second oppositely facing sides of the pylon, the first and second projections being oriented inwardly into the flow by a greater amount than are the remaining projections, wherein the pylon includes a heat shield having a first edge proximate to the first side of the pylon and a second edge proximate to the second side of the pylon, and wherein at least a portion of the first projection is positioned circumferentially outwardly from the first edge of the heat shield and at least a portion of the second projection is positioned circumferentially outwardly from the second edge of the heat shield.

13. The method of claim 12 wherein controlling the flow includes at least restricting the hot flow from passing adjacent to at least one of the sides of the pylon.

14. The method of claim 12 wherein controlling the flow includes entraining air from an adjacent flow of cooler bypass air by at a greater rate near the pylon than at other circumferential locations around the nozzle exit aperture.

15. The method of claim 12 wherein each of the first and second projections has a generally triangular shape with a tip and an inner and outer root, and wherein directing the hot flow includes directing the flow adjacent to the outer root of the first projection that is located circumferentially outwardly from the first side of the pylon, and directing the flow adjacent to the outer root of the second projection that is located circumferentially outwardly from the second side of the pylon.

16. The method of claim 12 wherein controlling the flow includes increasing an axial vorticity component of the flow near the pylon or the heat shield compared with an axial vorticity component of the flow at other circumferential locations around the exit aperture.

17. The method of claim 12 wherein controlling the flow includes controlling an amount of heating at the sides of the pylon.

18. A method for designing an aircraft system, comprising:
sizing an engine pylon for carrying an aircraft engine and exhaust nozzle having a hot exhaust flow path;
configuring a set of multiple projections extending aft around an exit aperture of the nozzle to have a geometric feature that changes in a monotonic manner along at least a portion of a perimeter of the exit aperture, the projections including a first projection positioned nearest a first side of the pylon and a second projection positioned nearest a second side of the pylon facing generally opposite the first side; and
configuring a heat shield positioned to protect the pylon from exhaust gases, wherein configuring at least one of the heat shield and the set of projections is based at least in part on expected results of configuring the other of the heat shield and the set of projections, and wherein configuring at least one of the heat shield and the set of projections includes configuring at least a portion of the first projection to be circumferentially outwardly from a first edge of the heat shield positioned proximate to the first side of the pylon, and at least a portion of the second projection to be circumferentially outwardly from a second edge of the heat shield positioned proximate to the first side of the pylon.

19. The method of claim 18 wherein configuring multiple projections includes configuring the first and second projections to be immersed in the exhaust flow path to a greater degree than the remaining projections.

20. The method of claim 19 wherein configuring the first and second projections includes configuring the first and second projections to be angled inwardly into the flow path by a greater degree than the remaining projections.

21. The method of claim 18 wherein each of the first and second projections includes a tip and a root, and wherein configuring the heat shield includes aligning edges of the heat shield to be offset inwardly from the tips of the first and second projections.

22. The method of claim 18 wherein each of the first and second projections includes a tip and a root, and wherein configuring the heat shield includes aligning edges of the heat shield to be circumferentially aligned with the tips of the first and second projections.

* * * * *